United States Patent
Weiss et al.

(10) Patent No.: US 8,627,808 B2
(45) Date of Patent: Jan. 14, 2014

(54) METHOD FOR REGULATING A COMBUSTION PROCESS AND CONTROL DEVICE

(75) Inventors: Frank Weiss, Pentling/Grasslfing (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 898 days.

(21) Appl. No.: 12/676,077

(22) PCT Filed: Aug. 27, 2008

(86) PCT No.: PCT/EP2008/061189
§ 371 (c)(1),
(2), (4) Date: May 21, 2010

(87) PCT Pub. No.: WO2009/033950
PCT Pub. Date: Mar. 19, 2009

(65) Prior Publication Data
US 2010/0256891 A1 Oct. 7, 2010

(30) Foreign Application Priority Data
Sep. 7, 2007 (DE) .......................... 10 2007 042 577

(51) Int. Cl.
*F02M 69/04* (2006.01)
*F02B 47/08* (2006.01)

(52) U.S. Cl.
USPC .................... 123/568.21; 123/435; 123/494

(58) Field of Classification Search
USPC .............. 123/435, 698, 568.21, 494; 701/103–105, 108, 115
See application file for complete search history.

(56) References Cited

U.S. PATENT DOCUMENTS

| | | | |
|---|---|---|---|
| 5,156,126 A * | 10/1992 | Ohkubo et al. | 123/406.43 |
| 5,361,745 A * | 11/1994 | Suzuki et al. | 123/435 |
| 5,636,614 A * | 6/1997 | Morikawa | 123/435 |
| 5,682,864 A | 11/1997 | Shirakawa | 123/569 |
| 5,878,717 A * | 3/1999 | Zur Loye | 123/435 |
| 7,231,906 B1 | 6/2007 | Haskara et al. | 123/435 |
| 7,257,479 B2 | 8/2007 | Damitz et al. | 701/105 |

(Continued)

FOREIGN PATENT DOCUMENTS

| | | | |
|---|---|---|---|
| DE | 19631112 A1 | 2/1997 | F02D 43/00 |
| DE | 19727866 A1 | 2/1999 | F02D 45/00 |

(Continued)

OTHER PUBLICATIONS

International PCT Search Report, PCT/EP2008/061189, 4 pages, Jan. 16, 2009.

(Continued)

*Primary Examiner* — Thomas Moulis
(74) *Attorney, Agent, or Firm* — King & Spalding L.L.P.

(57) ABSTRACT

In a control device and a method for regulating a combustion process in an internal combustion engine, fuel is injected into the internal combustion engine for combustion, wherein exhaust gas is returned in an intake channel, wherein a combustion point of the combustion is detected, wherein the detected point of time is compared to a target value, wherein depending on the comparison result the injection is changed in order to move the combustion toward the target value, wherein part of the change of the injection is translated into an adaptation value for regulating the exhaust gas return in order to move the combustion in the direction of the target value.

16 Claims, 2 Drawing Sheets

(56) References Cited

U.S. PATENT DOCUMENTS

| | | | |
|---|---|---|---|
| 7,258,106 B2 | 8/2007 | Yamaguchi et al. | 123/434 |
| 7,489,998 B2 | 2/2009 | Bauer et al. | 701/103 |
| 7,707,992 B2 * | 5/2010 | VanDyne et al. | 123/435 |
| 8,371,120 B2 * | 2/2013 | Chadwell | 60/605.2 |
| 2003/0200955 A1 * | 10/2003 | zur Loye et al. | 123/435 |
| 2005/0229903 A1 * | 10/2005 | Kobayashi et al. | 123/435 |
| 2006/0162689 A1 * | 7/2006 | Winkelman et al. | 123/299 |
| 2007/0209636 A1 * | 9/2007 | Ammann et al. | 123/435 |

FOREIGN PATENT DOCUMENTS

| | | | | |
|---|---|---|---|---|
| DE | 102004046086 A1 | 3/2006 | | F02D 43/00 |
| DE | 102005009104 B3 | 8/2006 | | F02D 41/00 |
| EP | 1746278 A2 | 1/2007 | | F02D 41/40 |
| GB | 2313927 A | 12/1997 | | F02D 21/08 |
| GB | 2328294 A | 2/1999 | | F02D 21/08 |

OTHER PUBLICATIONS

International PCT Preliminary Report on Patentability, PCT/EP2008/061189, 6 pages, Aug. 27, 2008.

German Office Action, German Patent Application No. 102007042577.7-26, 4 pages, May 7, 2008.

* cited by examiner

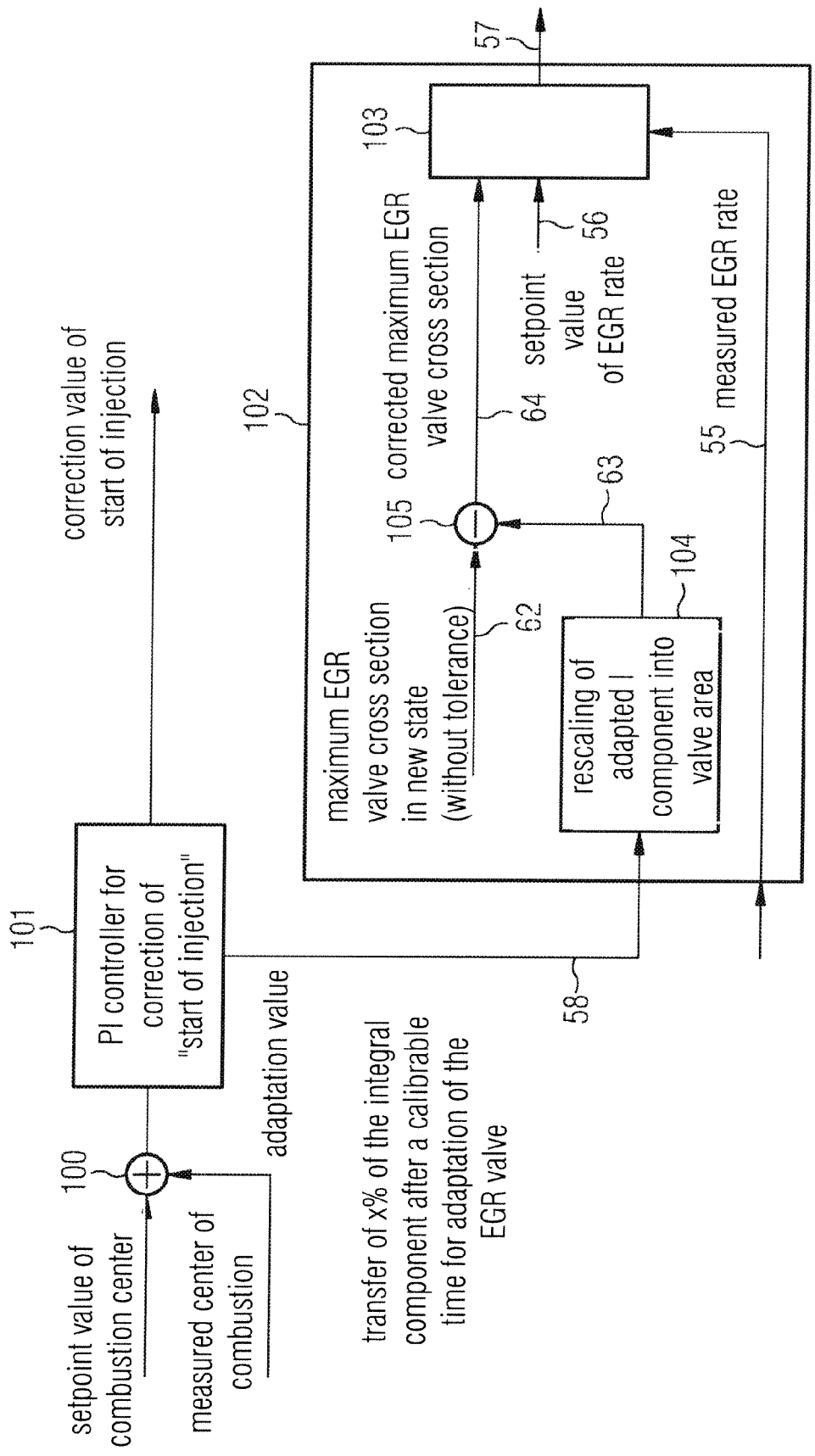
FIG 2  EGR parameter adaptation

US 8,627,808 B2

METHOD FOR REGULATING A COMBUSTION PROCESS AND CONTROL DEVICE

CROSS-REFERENCE TO RELATED APPLICATIONS

This application is a U.S. National Stage Application of International Application No. PCT/EP2008/061189 filed Aug. 27, 2008, which designates the United States of America, and claims priority to German Application No. 10 2007 042 577.7 filed Sep. 7, 2007, the contents of which are hereby incorporated by reference in their entirety.

TECHNICAL FIELD

The invention relates to a method for closed-loop control of a combustion process of an internal combustion engine and to a control unit.

BACKGROUND

From DE 19727866 C2 a device for controlling an internal combustion engine is known. The device has an internal combustion engine comprising a throttle valve in an intake tract and an exhaust-gas recirculation valve in an exhaust-gas recirculation device, wherein a first pilot control device is provided, the controlled variable of which is the exhaust-gas recirculation rate, and with which as an actuator the exhaust-gas recirculation valve is associated. A second pilot control device is provided, the controlled variable of which is the exhaust-gas recirculation rate, and with which as an actuator the throttle valve is associated. A first controller is further provided, the controlled variable of which is the exhaust-gas recirculation rate, and with which as an actuator the exhaust-gas recirculation valve is associated.

From DE 102005009104 B3 a method and an apparatus for controlling an internal combustion engine are known. Before or during an intermediate compression around the top dead center of a piston of an internal combustion engine upon charge changing a predefined first fuel mass is metered into the combustion chamber of the respective cylinder. During the intermediate compression, within a predefined first crankshaft angle window measured values of the pressure in the combustion chamber are acquired by means of a cylinder-pressure sensor. A measure for a degree of conversion of the first fuel mass is determined depending upon the acquired measured values of the pressure and reference values of the pressure that are characteristic of the corresponding pressure profile in the combustion chamber when no fuel is metered.

SUMMARY

According to various embodiments, a method for closed-loop control of a combustion process and a control unit for implementing the method can be provided, wherein a more precise closed-loop control, in particular of the exhaust gas recirculation, is achieved.

According to an embodiment, in a method for closed-loop control of a combustion process of an internal combustion engine, fuel for combustion is injected into the internal combustion engine, exhaust gas is recirculated into an intake channel, an instant of combustion is acquired, the acquired instant is compared with a setpoint value, wherein as a function of the comparison result the injection is varied in order to shift the instant of combustion in the direction of the setpoint value, and a fraction of the change of injection is converted to an adaptation value for closed-loop control of the exhaust-gas recirculation device in order to shift the combustion in the direction of the setpoint value.

According to a further embodiment, a closed-loop control method for the injection with a proportional component and/or with an integral component can be used, wherein the comparison result is used to correct the proportional component and/or the integral component. According to a further embodiment, a starting point of the injection can be varied in order to adapt the instant of combustion. According to a further embodiment, at least a fraction of the integral component and/or of the proportional component of the closed-loop control method for the injection can be reduced and converted to an adaptation value for closed-loop control of the exhaust gas recirculation in order to shift the combustion in the direction of the setpoint value. According to a further embodiment, as an adaptation value for closed-loop control of the exhaust-gas recirculation device an adapted value of a flow area of an exhaust-gas recirculation valve can be used. According to a further embodiment, the integral component of the closed-loop control method for the injection can be compared with a comparison value, and wherein upon overshooting of the comparison value the integral component is not adapted. According to a further embodiment, after a refueling operation it can be checked whether the integral component of the closed-loop control method of the injection is changing by more than a defined time rate of change, and that upon overshooting of the defined time rate of change the integral component of the closed-loop control method of the injection is not translated into an adaptation value for the closed-loop control method of the exhaust-gas recirculation device. According to a further embodiment, after a refueling operation for a defined operating period of the internal combustion engine at least a fraction of the integral component of the closed-loop control method of the injection is not translated into an adaptation value for the closed-loop control method of the exhaust-gas recirculation device. According to a further embodiment, at defined time intervals a fraction of the integral component of the closed-loop control method for the injection can be translated into a fraction of the closed-loop control method for the exhaust-gas recirculation device. According to a further embodiment, as an instant a center of combustion can be acquired.

According to another embodiment, a control unit for closed-loop control of the combustion of an internal combustion engine can be designed to implement a method as described above.

BRIEF DESCRIPTION OF THE DRAWINGS

Various embodiments are described below with reference to the diagrammatic drawings. The drawings show:

FIG. 2 a block diagram of the control device.

DETAILED DESCRIPTION

Figure 1:
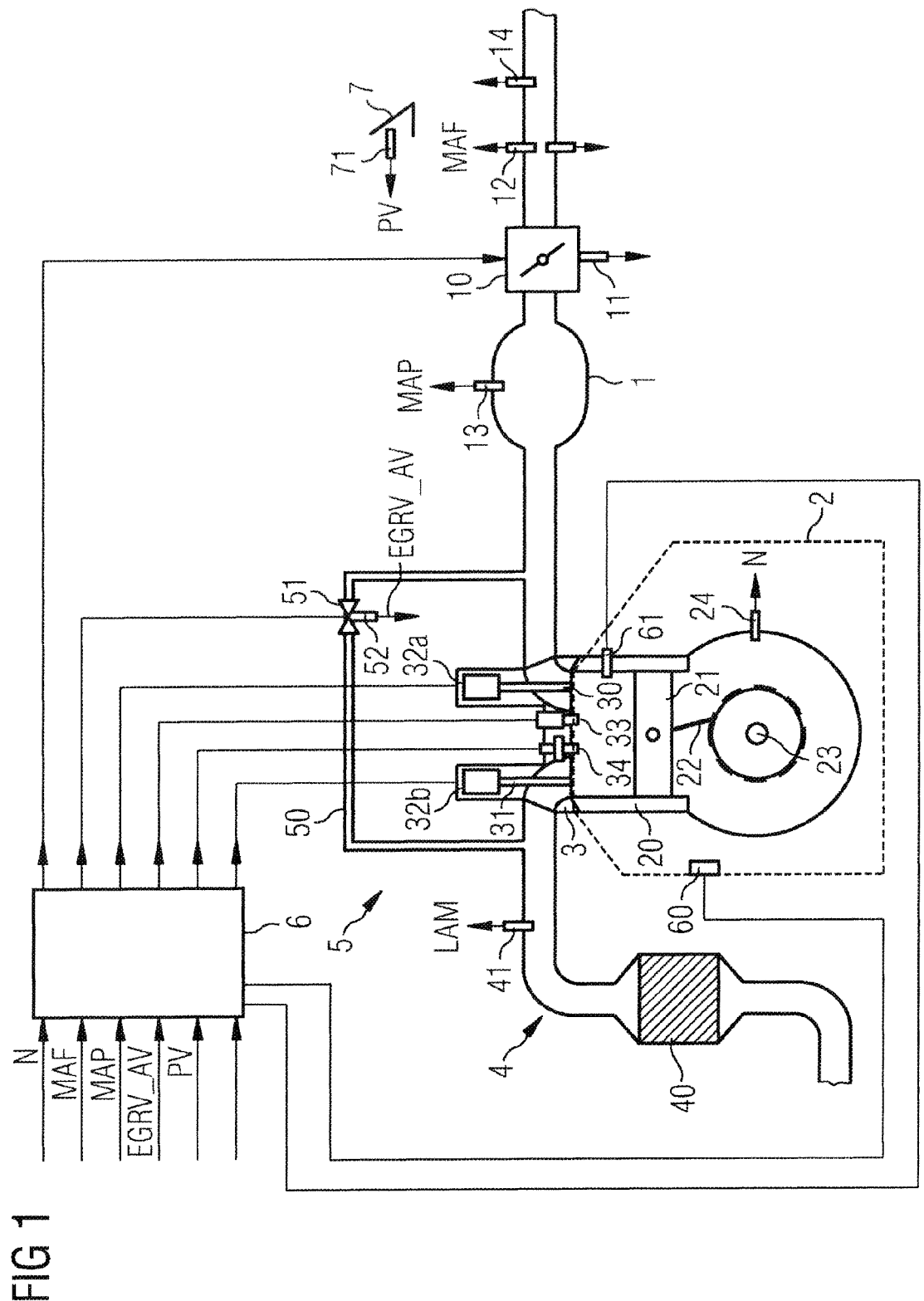
FIG. 1 an internal combustion engine with a control device.

An advantage of the method is that for closed-loop control of the combustion process the injection is varied in order to shift the combustion in the direction of the setpoint value, wherein a fraction of the variation of the injection is converted to an adaptation value for closed-loop control of the exhaust gas recirculation in order to shift the combustion in the direction of the setpoint value.

In this way an improved adaptation of the exhaust gas recirculation is achieved in order to shift an instant of combustion of the internal combustion engine in the direction of a setpoint value.

In one embodiment, for closed-loop control of the injection a control method with a proportional component and/or with an integral component is used, wherein the result of comparison between the setpoint value and the actual value of the instant of combustion is used to correct the proportional component and/or the integral component.

In a further embodiment, at least a fraction of the integral component and/or a fraction of the proportional component of the closed-loop control method for the injection is converted to an adaptation value for closed-loop control of the exhaust gas recirculation in order to shift the combustion in the direction of the setpoint value. The corresponding integral component and/or the proportional component of the closed-loop control method for the injection is adapted accordingly. In this way, an optimized adaptation of the exhaust gas recirculation for closed-loop control of the instant of combustion is possible.

In a further embodiment, as an adaptation value for the closed-loop control of the exhaust gas recirculation an adaptive value of a flow area of an exhaust-gas recirculation valve is used.

FIG. 1 shows an internal combustion engine, which comprises an intake tract 1 with a throttle valve 10 as well as an engine block 2 having at least one cylinder 20 and a crankshaft 23. A piston 21 and a connecting rod 22 are associated with the cylinder 20. The connecting rod 22 is connected to the piston 21 and to the crankshaft 23. A cylinder head 3 is further provided, in which is disposed a valve actuator having at least one inlet valve 30, one outlet valve 31 as well as in each case one valve actuator 32a associated with the inlet valve 30 and one valve actuator 32b associated with the outlet valve 31. The valve actuators 32, 32b each comprise a non-illustrated camshaft with a transmission device, which transmits the cam lift to the inlet valve 30 and/or the outlet valve 31. Alternatively, one electromagnetic actuator each may be provided for controlling the valve lift profile of the inlet valve 30 and/or the outlet valve 31.

In the cylinder head 3 an injection valve 33 and a spark plug 34 are introduced. Depending on the selected embodiment, it is possible to dispense with the spark plug 34. The injection valve 33 is disposed in such a way that the fuel is injected directly into the interior of the cylinder 20. The injection valve 33 may however alternatively be disposed in such a way that the fuel is injected into the intake tract 1. The internal combustion engine may also be embodied as a compression-ignition internal combustion engine. The internal combustion engine further comprises an exhaust tract 4, in which a catalytic converter 40 is disposed. The internal combustion engine has an exhaust-gas recirculation device 5 with an exhaust-gas recirculation pipe 50, which extends from the exhaust tract 4 to the intake tract 1. Disposed in the exhaust-gas recirculation pipe 50 is an exhaust-gas recirculation valve 51. The exhaust-gas recirculation valve 51 is embodied as a lifting valve. It may however be embodied as a flap for example. A control unit 6 for the internal combustion engine is further provided, associated with which are sensors that acquire various measured variables and determine in each case the measured value of the measured variable. The control unit 6 depending upon at least one measured variable determines one or more actuating signals, which control in each case an actuator.

The sensors may take the form of a pedal position sensor 71 that acquires a pedal position PV of the accelerator 7, the form of a throttle-valve position sensor 11 that acquires a degree of opening THR of the throttle valve 10, the form of an air-mass meter 12 that acquires an air-mass flow MAF and/or the form of an intake-manifold pressure sensor 13 that acquires an intake-manifold pressure MAP, the form of a temperature sensor 14 that acquires an intake air temperature TAL, the form of a rotational speed sensor 24 that acquires a rotational speed N of the crankshaft 23, the form of an oxygen sensor 41 that acquires the residual oxygen content of the exhaust gas and assigns the exhaust gas an excess-air factor LAM, and the form of a position sensor 52 that acquires the degree of opening EGRV_AV of the exhaust-gas recirculation valve 51. A structure-borne noise sensor 60 is further provided, which is likewise connected to the control unit 6.

Instead of or in addition to the structure-borne noise sensor 60 a cylinder pressure sensor 61 may be provided, which directly acquires the pressure profile in the cylinder and hence may determine a center of the combustion.

Depending on the embodiment, fewer than the described sensors or additional sensors may be provided.

Operating variables comprise the measured variables as well as variables derived therefrom. The control units comprise in each case an actuating drive and an actuator. The actuating drive is an electromotive drive, an electromagnetic drive or a mechanical drive. The actuators are embodied as throttle valve 10, exhaust-gas recirculation valve 51, injection valve 33, spark plug 34 or an adjusting device for adjusting the valve lift of the inlet- or outlet valves 30, 31.

The control unit 6 is preferably embodied as an electronic engine management system, wherein depending on the embodiment a plurality of control units may be provided, which are in communication with one another via data- and control lines or for example via a bus system.

The control unit 6 is used for open-loop control of the internal combustion engine, in particular for open-loop control of the injection of fuel into the internal combustion engine. To define the fuel quantity and to define the injection time, at which the fuel is injected by the injection valve 33 into the cylinder, the control unit 6 determines a desired torque depending upon the accelerator pedal value PV and the rotational speed N. Preferably, determination of the desired torque is effected by means of a characteristic map that is a function of the accelerator pedal value PV and the rotational speed N. Depending on the selected embodiment, the characteristic map may additionally be a function of further operating variables, such as the intake air temperature, a cooling water temperature or an oil temperature.

The control unit 6 with the aid of a second characteristic map additionally determines a setpoint value for an exhaust-gas recirculation rate, which is likewise a function of the desired torque and the rotational speed. The characteristic map values of the second characteristic map may be optimized with regard to the efficiency of the internal combustion engine and with regard to the $NO_x$ emissions.

An internal combustion engine with petrol direct injection is operated in predefined operating ranges, such as for example partial load, with an inhomogeneous very lean fuel-air mixture and a high exhaust-gas recirculation rate (up to 50%). In order to guarantee the conversion of the $NO_x$ emissions by the catalytic converter 4, the internal combustion engine at predefined time intervals (of for example 1 minute) is operated with a homogeneous air-fuel mixture and a low exhaust-gas recirculation rate (of for example less than 10%). For this reason, the characteristic map values stored in the second characteristic map may be additionally dependent upon a mode of operation of the internal combustion engine, i.e. dependent upon a homogeneous or an inhomogeneous operation.

The control unit 6 may further comprise an observer, which by means of physical modeling of the intake tract 1 and the exhaust-gas recirculation device 5 calculates an estimated value of the recirculated exhaust-gas mass flow through the exhaust-gas recirculation pipe 50, an estimated value of an exhaust-gas back pressure in the exhaust tract 4, an estimated value of the ambient pressure and optionally an estimated value of the intake manifold pressure.

With the aid of the structure-borne noise sensor 60 or the cylinder pressure sensor 61 the control unit 6 determines the instant of combustion and/or a center of combustion. The center of combustion may for example be equated with the time, at which a maximum structure-borne noise is acquired or a maximum pressure prevails in the cylinder during a combustion cycle. Depending on the selected embodiment, a correlating time lag between the center of combustion and the pressure center may also be taken into consideration. The correlating time lag may be determined with the aid of reference measurements.

Depending upon the center of combustion and a predefined time center of combustion an injection-quantity correction value may be determined. For this purpose it is possible for example also to provide a controller that has for example a P component, an I component and/or a D component. The injection-quantity correction value may also be determined depending upon a characteristic map. Preferably, determination of the injection-quantity correction value is effected with reference to the respective actual load point, which may be predefined for example by means of a desired torque.

Alternatively or additionally an exhaust-gas recirculation rate correction value and/or an injection start angle correction value for correcting an injection start angle of an injection may be determined in a corresponding manner and, like the injection-quantity correction value, stored in the memory of the control unit 6 for further operation of the internal combustion engine. For operation of a petrol engine λ=1, instead of the injection the ignition may be corrected.

The exhaust-gas recirculation rate, the injection quantity and the start of injection are adapted in such a way that the center of combustion is shifted in the direction of a desired setpoint instant.

FIG. 2 shows in a block diagram a view of the functions executed by the control unit 6. A setpoint value for the instant of the combustion center and a measured instant for the combustion center are supplied to a first comparison unit 100. The comparison unit 100 reads out the setpoint value for the instant of the combustion center from a characteristic map or the control unit 6 calculates the setpoint value from operating conditions of the internal combustion engine and communicates the setpoint value to the comparison unit 100. The first comparison unit 100 determines the difference between the setpoint value of the instant of the combustion center and the measured instant of the combustion center and transmits the difference to a controller 101. The comparison unit 100 in a simple embodiment may take the form of a summing unit, wherein the setpoint value of the instant of the combustion center with a positive value and the measured instant of the combustion center with a negative value are summed. In this way, using simple means a differential value is computed. Depending on the selected embodiment, the comparison unit 100 may alternatively have a different mode of operation.

The controller 101 for example is embodied as a proportional-plus-integral controller, the task of which is to determine a correction value for the injection, for example a correction value for the start of injection. The proportional component takes into account the difference multiplied by a defined factor. The integral component sums up the differences of a defined number of preceding differences, which are weighted individually with factors or in total with factors. The task of the controller 101 is to minimize the input value that is supplied by the comparison unit 100.

The differential value is taken into account in the proportional component and in the integral component I of the controller 101 and a correction value for the injection is calculated therefrom. For calculating the correction value as a function of the differential value, formulae and/or characteristic maps are stored, which in addition to the correction value take operating parameters of the internal combustion engine into account. The correction value may influence for example the fuel quantity, i.e. for example the duration of injection, and the starting point of injection. With the aid of the calculated correction value or values for the start of injection and/or the duration of injection the control unit 6 triggers the corresponding actuators in order to change the start of injection and/or the duration of injection. In this case, the injection valves are triggered in a corresponding manner by the control unit 6.

The controller 101 moreover determines an adaptation value 58, which is supplied to a second controller 102. The adaptation value is used to transfer at least part of the closed-loop control intervention, i.e. of the correction value of the closed-loop injection control, which is generated by the deviation from the combustion center, to the closed-loop control of the exhaust gas recirculation.

The second controller 102 is used to adapt the exhaust-gas recirculation rate in such a way that there is compliance with a setpoint value for the exhaust-gas recirculation rate. The second controller is moreover used to correct at least part of the deviation from the combustion center so that the instant of the combustion center is moved closer to the setpoint value of the instant of the combustion center. The adaptation value indicates whether the measured instant of the combustion center is displaced in the direction of "early" or in the direction of "late" relative to the setpoint value of the combustion center. The second controller 102 depending upon the adaptation value 58 corrects the trigger values for the exhaust-gas recirculation valve 51. The corrected trigger values are relayed from the control unit 6 in an appropriate manner to the exhaust-gas recirculation valve 51. The second controller 102 receives as a first input value 55 a measured exhaust-gas recirculation rate and as a second input value 56 a setpoint value for the exhaust-gas recirculation rate. The setpoint value for the exhaust-gas recirculation rate is stored for example in a characteristic map as a function of operating parameters of the internal combustion engine. From the comparison between the setpoint value and the measured value for the exhaust-gas recirculation rate a correction value 57 for triggering of the exhaust-gas recirculation valve 51 is determined in a calculation unit 103. The correction value for triggering of the exhaust-gas recirculation valve 51 is used by the control unit 6 to correct the triggering of the exhaust-gas recirculation valve 51 in a corresponding manner. The adaptation value 58, which is made available by the first controller 101 to the second controller 102, is correspondingly taken into account when calculating the correction value. The adaptation value may be taken into account for example in the setpoint value of the exhaust-gas recirculation rate or in the measured exhaust-gas recirculation rate in order to achieve a corresponding correction of the correction value.

In a further embodiment, the adaptation value is taken into account when considering a maximum valve cross section of the exhaust-gas recirculation valve 51. For this purpose, the adaptation value 58 is converted in a scaling unit 104 to a corresponding valve area and supplied to a summing unit 105. The summing unit 105 receives as a further input value a maximum valve cross section of the recirculation valve 51. From the maximum valve cross section and the adapted valve area 63 the summing unit 105 calculates a corrected maximum valve cross section 64 and transmits this to the calculation unit 103. The calculation unit 103, when calculating the correction value for triggering of the recirculation valve, in addition to the setpoint value for the exhaust-gas recirculation rate takes into account the measured exhaust-gas recirculation rate and the corrected maximum valve cross section of the recirculation valve. In the calculation unit 103 appropriate formulae and/or characteristic maps are stored, with which on the basis of the setpoint value of the exhaust-gas recirculation rate and the measured exhaust-gas recirculation rate and the corrected maximum valve cross section and as a function of operating parameters of the internal combustion engine a correction value 57 for triggering of the recirculation valve 51 is calculated.

For this purpose, for example the mass flow that is fed back by the recirculation valve 51 from the exhaust tract into the intake tract is calculated with the aid of a physical model. The mass flow is dependent upon the pressure upstream and the pressure downstream of the recirculation valve and upon the maximum flow cross section of the recirculation valve. Thus, the adaptation value provided in the form of a corrected maximum valve cross section by the controller 101 is taken into account in the determination of the mass flow and hence in the triggering of the recirculation valve. From a desired mass flow, which is dependent upon operating parameters of the internal combustion engine, the calculation unit 103 determines a desired valve flow cross section and an opening angle of the valve. If the maximum valve cross section of the recirculation valve is then varied, a larger opening angle of the valve has to be triggered in order to obtain the identical mass flow.

If for example the corrected maximum valve cross section is reduced, this leads to a larger opening of the recirculation valve 51. As a result, the combustion center is then shifted in the direction "late", which would result in the start of injection being brought back in the direction of the original value.

The combustion center may shift for example as a result of coking of the exhaust-gas recirculation valve 51 and hence a reduction of the actual maximum valve cross section. As this reduction is not acquired by the calculation unit 103, the calculation unit 103 erroneously calculates too high a mass flow of the exhaust-gas recirculation valve that is however, because of the coking, not provided through the exhaust-gas recirculation valve. The actual exhaust-gas recirculation rate therefore reduces compared to the calculated exhaust-gas recirculation rate. Thus, the instant of the combustion center occurs at an earlier time position, i.e. measured at an earlier crankshaft angle, than expected. In the controller 101 this effect is corrected very rapidly by a later instant of the start of injection.

A fraction of the correction value of the first controller 101 is reduced in the first controller 101 and transmitted in the form of the adaptation value to the second controller 102. For example, the proportional component of the controller 101 and/or the integral component of the controller 101 is reduced and transmitted in the form of the adaptation value to the second controller 102. In a first embodiment, only a fraction of the integral component of the first controller 101 is reduced and transmitted in the form of the adaptation value to the second controller 102. The adaptation value is converted as a function of stored scaling tables by the scaling unit 104 to a corresponding cross-sectional area of the exhaust-gas recirculation valve.

In the described exemplary embodiment, in order to correct the coked exhaust-gas recirculation valve the maximum cross-sectional area of the exhaust-gas recirculation valve should be reduced. In a corresponding manner the adaptation value is converted by the scaling unit 104 to a valve cross-sectional area and supplied with a negative value to the summing unit 105. The reduced maximum valve cross section leads in the calculation unit 103 to a larger opening of the valve. As a result, the combustion center is then shifted in the direction "late", which brings the start of injection back to the original value.

The correction value of the first controller 101, in particular the proportional component and/or the integral component of the first controller 101 should be reduced from time to time, i.e. for example at defined time intervals, and transmitted in the form of the adaptation value to the second controller 102. This achieves the effect that the correction value of the first controller 101, in particular the integral component of the first controller 101 is adapted and transferred to the second controller 102, i.e. to the closed-loop control of the exhaust-gas recirculation rate. For example, as a time interval a minute may be fixed. For example, for generation of the adaptation value 10% of the P component and/or of the I component of the controller 101 is reduced in value and transferred as an adaptation value to the second controller 102.

In a further embodiment, the control unit 6, for example with the aid of a level sensor in the tank, monitors whether the tank for receiving fuel, with which the internal combustion is supplied with power, has been filled up, i.e. refueled. If this is the case, then for example for a defined operating period of the internal combustion engine the generation and transmission of an adaptation value to the second controller 102 is suspended. In a further embodiment, after refueling of the tank it is checked whether in particular the I components of the first controller, i.e. of the closed-loop control method for the injection, lie below a defined threshold. If the I components of the closed-loop control method for the injection vary faster than is allowed with the defined threshold, then it is assumed that the fuel quality has changed.

Thus, for a defined operating period or a defined number of kilometers, which a vehicle with the internal combustion engine travels, no adaptation values are generated and transmitted to the second controller 102. It is only when the defined operating period and/or the defined number of kilometers has been completed and/or the time rate of change of the I components of the closed-loop control method have dropped below the defined threshold that adaptation values are once more generated by the first controller 101 and transmitted to the second controller 102. Thus, a fraction of the adaptation value that may be ascribed to the varied fuel quality is not taken into account when generating the adaptation value. This prevents a variation of the fuel quality from having an effect upon the closed-loop control of the exhaust gas recirculation, in particular upon parameters of the exhaust-gas recirculation model.

What is claimed is:

1. A method for closed-loop control of a combustion process of an internal combustion engine, comprising the steps of:
   injecting fuel for combustion into the internal combustion engine,
   recirculating exhaust gas into an intake channel,
   acquiring an instant of combustion,
   comparing the acquired instant with a setpoint value, varying, as a function of the comparison result, the injection in order to shift the instant of combustion in the direction of the setpoint value, and converting a fraction of the change of injection to an adaptation value for closed-loop control of the exhaust-gas recirculation device in order to shift the combustion in the direction of the setpoint value, wherein a P-I-controller executes the closed-loop control method for the injection using a proportional component and an integral component, wherein the comparison result is used to correct the proportional component and the integral component, and wherein one of the proportional component and integral component of the closed loop method for the injection is reduced and converted to an adaptation value for closed-loop control of the exhaust gas recirculation in order to shift the combustion in the direction of the setpoint value.

2. The method according to claim 1, wherein a starting point of the injection is varied in order to adapt the instant of combustion.

3. The method according to claim 1, wherein as an adaptation value for closed-loop control of the exhaust-gas recirculation device an adapted value of a flow area of an exhaust-gas recirculation valve is used.

4. The method according to claim 1, wherein the integral component of the closed-loop control method for the injection is compared with a comparison value, and wherein upon overshooting of the comparison value the integral component is not adapted.

5. The method according to claim 1, wherein after a refueling operation it is checked whether the integral component of the closed-loop control method of the injection is changing by more than a defined time rate of change, and that upon overshooting of the defined time rate of change the integral component of the closed-loop control method of the injection is not translated into an adaptation value for the closed-loop control method of the exhaust-gas recirculation device.

6. The method according to claim 1, wherein after a refueling operation for a defined operating period of the internal combustion engine at least a fraction of the integral component of the closed-loop control method of the injection is not translated into an adaptation value for the closed-loop control method of the exhaust-gas recirculation device.

7. The method according to claim 1, wherein at defined time intervals a fraction of the integral component of the closed-loop control method for the injection is translated into a fraction of the closed-loop control method for the exhaust-gas recirculation device.

8. The method according to claim 1, wherein as an instant a center of combustion is acquired.

9. A control unit for closed-loop control of the combustion of an internal combustion engine, the control unit including:

a P-I controller operable to control the internal combustion engine such that:

fuel is injected for combustion into the internal combustion engine, exhaust gas is recirculated into an intake channel, an instant of combustion is acquired, the acquired instant is compared with a setpoint value, as a function of the comparison result, the injection is varied in order to shift the instant of combustion in the direction of the setpoint value, and a fraction of the change of injection is converted to an adaptation value for closed-loop control of the exhaust-gas recirculation device in order to shift the combustion in the direction of the setpoint value; and the P-I controller further operable to execute a closed-loop control method for the injection using a proportional component and an integral component, wherein the comparison result is used to correct the proportional component and the integral component, and wherein one of the proportional component and the integral component of the closed-loop control method for the injection is reduced and converted to an adaptation value for closed-loop control of the exhaust gas recirculation in order to shift the combustion in the direction of the setpoint value.

10. The control unit according to claim 9, wherein a starting point of the injection is varied in order to adapt the instant of combustion.

11. The control unit according to claim 9, wherein as an adaptation value for closed-loop control of the exhaust-gas recirculation device an adapted value of a flow area of an exhaust-gas recirculation valve is used.

12. The control unit according to claim 9, wherein the integral component of the closed-loop control method for the injection is compared with a comparison value, and wherein upon overshooting of the comparison value the integral component is not adapted.

13. The control unit according to claim 9, wherein after a refueling operation it is checked whether the integral component of the closed-loop control method of the injection is changing by more than a defined time rate of change, and that upon overshooting of the defined time rate of change the integral component of the closed-loop control method of the injection is not translated into an adaptation value for the closed-loop control method of the exhaust-gas recirculation device.

14. The control unit according to claim 9, wherein after a refueling operation for a defined operating period of the internal combustion engine at least a fraction of the integral component of the closed-loop control method of the injection is not translated into an adaptation value for the closed-loop control method of the exhaust-gas recirculation device.

15. The control unit according to claim 9, wherein at defined time intervals a fraction of the integral component of the closed-loop control method for the injection is translated into a fraction of the closed-loop control method for the exhaust-gas recirculation device.

16. The control unit according to claim 9, wherein as an instant a center of combustion is acquired.

* * * * *